(12) United States Patent
Berning et al.

(10) Patent No.: US 12,486,766 B2
(45) Date of Patent: *Dec. 2, 2025

(54) MILLING MACHINE AND METHOD FOR OPERATING A MILLING MACHINE

(71) Applicant: Wirtgen GmbH, Windhagen (DE)

(72) Inventors: Christian Berning, Zuplich (DE);
Thomas Lehnert, Oberraden (DE);
Philip Verhaelen, Cologne (DE)

(73) Assignee: Wirtgen GmbH, Windhagen (DE)

( * ) Notice: Subject to any disclaimer, the term of this patent is extended or adjusted under 35 U.S.C. 154(b) by 264 days.

This patent is subject to a terminal disclaimer.

(21) Appl. No.: 18/210,914

(22) Filed: Jun. 16, 2023

(65) Prior Publication Data

US 2024/0026787 A1     Jan. 25, 2024

Related U.S. Application Data

(63) Continuation of application No. 17/582,309, filed on Jan. 24, 2022, now Pat. No. 11,719,099, which is a
(Continued)

(30) Foreign Application Priority Data

Oct. 27, 2015   (DE) ..................... 10 2015 118 330.7
Jul. 19, 2016   (DE) ..................... 10 2016 113 251.9

(51) Int. Cl.
*E01C 23/088*     (2006.01)
*E01C 21/00*     (2006.01)
(Continued)

(52) U.S. Cl.
CPC ............ *E21C 35/302* (2023.05); *E01C 21/00* (2013.01); *E01C 23/088* (2013.01); *E21C 25/10* (2013.01); *E21C 41/00* (2013.01)

(58) Field of Classification Search
CPC ...... E01C 21/00; E01C 23/088; E21C 35/302; E21C 25/10; E21C 41/00
See application file for complete search history.

(56) References Cited

U.S. PATENT DOCUMENTS 5,092,657 A    3/1992   Bryan, Jr.
6,877,818 B1    4/2005   Gaertner et al.
(Continued)

FOREIGN PATENT DOCUMENTS

CN     1143919 A    2/1997
CN     1360653 A    7/2002
(Continued)

OTHER PUBLICATIONS

China Office Action for corresponding patent application No. 202110189567.8, dated Nov. 17, 2021, 9 pages (not prior art).
(Continued)

*Primary Examiner* — Carib A Oquendo
(74) *Attorney, Agent, or Firm* — Gary L. Montle; Lucian Beavers; Patterson Intellectual Property Law, PC

(57) ABSTRACT

The invention relates to a milling machine having a replaceable milling drum, different types of milling drums being capable of being associated with the milling machine; and having a control unit for controlling the milling machine, machine parameters of the milling machine being settable by way of the control unit. Provision is made that the milling machine has associated with it at least one means that is designed to detect at least one characteristic feature of the milling drum; that the at least one means is connected to the control unit; and that the control unit is designed to specify for at least one machine parameter, indirectly or directly from the characteristic feature, a value to be set, and/or a setting range. The invention further relates to a corresponding milling drum and to a corresponding method. The milling machine, milling drum, and method allow the selec-
(Continued)

tion of machine parameters for operation of the milling machine to be simplified.

20 Claims, 6 Drawing Sheets

Related U.S. Application Data continuation of application No. 16/708,540, filed on Dec. 10, 2019, now Pat. No. 11,236,611, which is a continuation of application No. 16/221,793, filed on Dec. 17, 2018, now Pat. No. 10,508,541, which is a continuation of application No. 15/283,631, filed on Oct. 3, 2016, now Pat. No. 10,167,721.

(51) Int. Cl.
E21C 25/10 (2006.01)
E21C 35/00 (2006.01)
E21C 41/00 (2006.01)

(56) References Cited

U.S. PATENT DOCUMENTS

| | | | |
|---|---|---|---|
| 7,984,953 | B2 | 7/2011 | Gaertner et al. |
| 8,118,369 | B2 | 2/2012 | Holl et al. |
| 8,690,474 | B2 | 4/2014 | Jurasz et al. |
| 8,738,304 | B2 * | 5/2014 | Hall ................ G05B 19/4065 702/34 |
| 9,879,391 | B2 | 1/2018 | Berning et al. |
| 10,287,882 | B2 | 5/2019 | Barimani et al. |
| 10,378,350 | B2 * | 8/2019 | Berning ................ E21C 25/10 |
| 11,236,611 | B2 | 2/2022 | Berning et al. |
| 2008/0185903 | A1 | 8/2008 | Bausov et al. |
| 2010/0256878 | A1 | 10/2010 | Zegowitz |
| 2012/0049607 | A1 | 3/2012 | Frederick |
| 2013/0162004 | A1 | 6/2013 | Killion |
| 2015/0227120 | A1 | 8/2015 | Laux et al. |
| 2015/0300165 | A1 * | 10/2015 | Marsolek .............. E01C 23/088 299/39.4 |
| 2017/0114637 | A1 * | 4/2017 | Berning .................. E21C 41/00 |

FOREIGN PATENT DOCUMENTS

| | | |
|---|---|---|
| CN | 2561813 Y | 7/2003 |
| CN | 1888315 A | 1/2007 |
| CN | 2903167 Y | 5/2007 |
| CN | 101046085 A | 10/2007 |
| CN | 101205699 A | 6/2008 |
| CN | 101310077 A | 11/2008 |
| CN | 101858049 A | 10/2010 |
| CN | 206279432 U | 6/2017 |
| DE | 3616170 A1 | 3/1987 |
| DE | 19932396 A1 | 2/2001 |
| DE | 102006015506 B3 | 11/2007 |
| DE | 102014001885 A1 | 8/2015 |
| DE | 102015111249 A1 | 1/2017 |
| DE | 102016113251 A1 | 4/2017 |
| DE | 102018214762 A1 | 3/2020 |
| EP | 2239374 A1 | 10/2010 |
| EP | 2716816 A1 | 4/2014 |
| EP | 3260603 A1 | 12/2017 |
| GB | 2481669 A | 1/2012 |
| WO | 2020043529 A1 | 3/2020 |

OTHER PUBLICATIONS

China Office Action in parallel Chinese application No. 201610912293. X, dated Nov. 26, 2018 (not prior art).
Search Report of corresponding patent application CN 201610912293, dated Oct. 19, 2016 (not prior art).
German Search Report in corresponding German Patent Application No. 10 2015 118 332.3 dated Jul. 29, 2016, 10 pp. (not prior art).
Office Action of Feb. 28, 2017 in corresponding European application 16180765.6-1614, 7 pp. with an English machine translation (not prior art).
German Office Action for corresponding patent application 10 2021 117 495.3, dated Jun. 9, 2022, 10 pages (not prior art).

* cited by examiner

MILLING MACHINE AND METHOD FOR OPERATING A MILLING MACHINE

BACKGROUND OF THE INVENTION

1. Field of the Invention

The invention relates to a milling machine, in particular a road milling machine, a stabilizer, a recycler, a surface miner, or the like, having a replaceable milling drum, different types of milling drums being capable of being associated with the milling machine; and having a control unit for controlling the milling machine, machine parameters of the milling machine being settable by way of the control unit.

The invention further relates to a milling drum for such a milling machine, and to a method for operating such a milling machine.

2. Description of the Prior Art

Ground milling machines are used for many different tasks, for example in road and street construction or for raw materials extraction by surface mining.

In the context of road milling, for example, in one possible application it is known to process the surface of traffic routes by so-called "fine milling," for example in order to improve the nonslip quality of a road surface or to re-establish a smooth traffic route. Road milling machines are also used to remove entire layers of the road structure by milling. The milled material that is obtained is then usually loaded and conveyed to a recycling process for the production of new road-building material.

In so-called cold recycling, road milling machines are used to mill the road material off and to process it on site. For this, the milled material is mixed with binding agents, for example with foamed bitumen, so as thereby to generate, directly on-site, a mixed material suitable for reconstruction. The mixed material is then used to reconstruct the travel route.

A further task that can be carried out using ground milling machines is the stabilization of substrates having insufficient load-bearing capacity. Here the surface material that is present is comminuted or homogenized to a certain degree as necessary, and blended with a binding agent. Water, lime, cement, suspension, and the like can be used as a binding agent. Sufficient load-bearing capacity for the substrate is achieved thanks to the addition of the binding agent.

A ground milling machine can be designed to execute various ones of the tasks described. Because of the different requirements placed on the ground milling machine in the context of the individual processes, it is necessary to use different milling drums for the various tasks. For example, milling drums that are used for fine milling comprise an appreciably larger number of milling tools than milling drums that are used to remove entire layers. In the case of milling drums that are used to stabilize the substrate, the milling tools are arranged on struts that serve to blend the milled material with the binding agent. Even for identical or similar assignments, different types of milling drums that have each been optimized for certain application sectors can be used. In addition, many milling machines offer the option of using milling drums of different working widths in order to adapt the milling machine to different assignments. It is furthermore known that milling drums can be equipped with different milling tools, in particular different bits, that have likewise been optimized for special applications.

In addition to the different milling drums and milling tools used for the various assignments, the machine parameters with which the milling machine is operated must also be adapted to the respective assignment. The machine parameters to be taken into account here are, in particular, the advance speed of the milling machine, the milling depth, and the rotation speed of the milling drum. It can furthermore be necessary to adapt the rotation speed of a drive motor, as well as the power or torque transferred to the milling drum, to the respective assignment. It can be necessary in this context to set machine parameters in such a way that there is a predefined ratio among them. One example of this is the ratio of the advance speed to the milling drum rotation speed in the context of fine milling, which ratio must not exceed a specific threshold value since undesired structures will otherwise occur on the surface.

Additional parameters for operating the road milling machine can depend specifically on the milling drum being used, for example:
volume of water to be used;
width of the water bar used (for narrow-width milling drums);
permissible curve radii;
co-directional/counter-directional operation of the mill.

DE 10 2014 001 885 A1 discloses a method for optimizing an operating function of a ground milling machine. Here a variable operating parameter of the ground milling machine is varied until an operating function that is to be optimized assumes its optimum value. A variable operating parameter can be, in this context, a rotation speed of the milling drum, which is varied until, for example, an advance speed of the milling machine, constituting an operating function, achieves its optimum value. Optimization here proceeds from an initial value to be specified for the variable operating parameter. Disadvantageously, it can happen in this context that the initial value of the variable operating parameter is specified in a range that is not suitable for the milling task at hand. It can furthermore happen, in particular with an optimization process that proceeds automatically, that the variable operating parameter is shifted, for optimization of the operating function, into a range that is not suitable for the milling task. It is furthermore disadvantageous that with this method, the optimum parameters for operation of the milling machine can only be ascertained and established during the milling process.

US 2015/0300165 A1 discloses a milling drum whose releasably mounted milling tools are fitted with a transponder (RFID). A milling machine can thereby determine at any time the number of milling tools present.

SUMMARY OF THE INVENTION

An object of the invention is to furnish a milling machine that enables simple setting of machine parameters suitable for the milling task that is to be carried out. A further object of the invention is to furnish a milling drum suitable therefor, and a corresponding method.

That object of the invention which relates to the milling machine is achieved in that the milling machine has associated with it at least one means that is designed to detect at least one characteristic feature of the milling drum; that the at least one means is connected to the control unit; and that the control unit is designed to specify for at least one machine parameter, indirectly or directly from the characteristic feature, a value to be set and/or a setting range.

That object of the invention which relates to the method is achieved in that at least one characteristic feature of the milling drum is detected using means arranged for that purpose on the milling machine; and that a value to be set, and/or a setting range, of at least one machine parameter is indirectly and/or indirectly ascertained depending on the at least one characteristic feature of the milling drum and is displayed and/or automatically set.

The detected characteristic feature is selected so that the milling task to be carried out, and thus a suitable value to be set, or suitable setting range, for the at least one machine parameter, can be inferred therefrom. The value to be set, or the setting range, can be derived directly from the feature, or an inference can be drawn from the characteristic feature as to a further characteristic value, from which the milling task, and the value to be set or the setting range, are gathered.

The predefined value to be set, or the predefined setting range, makes it easier for an operator of the milling machine to select suitable machine parameters. Incorrect settings can be avoided. This has a positive effect on the quality of the working result obtained, on milling performance, on the energy consumption of the milling machine, and on the wear on the milling tools.

According to a preferred variant embodiment of the invention provision can be made that the means or the control unit is designed to determine the type of milling drum from the characteristic feature; and that the control unit is designed to specify for at least one machine parameter, depending on the type of milling drum determined, a value to be set and/or a setting range. Once the type of milling drum installed is known, for example a specific type of standard milling drum, fine milling drum, or micro-fine milling drum, the nature of the milling task to be carried out is sufficiently known that suitable settings of the machine parameters for operation of the milling machine can be specified.

Reliable recognition of the type of milling drum that is present can be achieved by the fact that the at least one means is designed to detect external features of the milling drum as a characteristic feature of the installed milling drum. External features can be, in this context, dimensions of the milling drum as well as the number and arrangement of the milling tools that are mounted. It is advantageous in terms of the evaluation of such external features that they do not change, or do not change substantially, even after an extended operating duration of the milling drum and thus considerable erosion of the milling tools.

A further approach consists in determining the moment of inertia of the milling drum and deducing the type of milling drum therefrom.

According to a further variant embodiment of the invention provision can be made that the at least one means is designed to detect an identifying element of the milling drum as a characteristic feature of the installed milling drum. The identifying element unequivocally describes the type of milling drum that is present.

Milling tools adapted to a milling task are used for various tasks as parts of the milling drum. The milling task for which the milling drum is suitable is thus known by way of the milling tools respectively present on a milling drum that is present. Provision can thus advantageously be made that the at least one means is designed to detect the type of at least one milling tool of the milling drum as a characteristic feature of the installed milling drum. The milling tool can be, in particular, a bit. Advantageously, in order to detect the type of at least one milling tool, a characteristic feature of the milling tool itself can be determined. The value to be set, and/or the setting range, of the at least one machine parameter can advantageously be derived, as a characteristic feature of the installed milling drum, indirectly or indirectly from the ascertained type of the at least one milling tool. As long as no provision has been made for mixed population of the milling drum with different milling tools, it is sufficient to ascertain the type of one of the milling tools provided on the milling drum. In order to increase certainty in the context of determining the type of milling tools in such a case, however, several or all milling tools can be detected. If the milling drum is fitted with different milling tools, provision can advantageously be made that the type of several or all milling tools is detected.

In order to recognize the type of milling drum installed, provision can be made that a camera and/or a scanner and/or a barcode reader and/or an input device is indirectly or directly associated with the milling machine as a means for detecting the characteristic feature of the installed milling drum. The type of milling drum can be reliably determined with the aid of the camera or scanner on the basis of external features, for example the number and arrangement of milling tools mounted on the milling drum, or the external dimensions of the milling drum. An accurate determination of the type of milling drum can be made by way of a control unit connected to the camera or to the scanner, and an evaluation software program stored therein. A barcode that is mounted on the milling drum and identifies the type of milling drum can be read out using a barcode reader. Using the input device, for example, a serial designation of the milling drum can be inputted directly, and the type of milling drum can be determined therefrom.

Provision can preferably be made that an identifying element, in particular a letter sequence and/or number sequence, and/or a barcode, is arranged in or on the milling drum as a characteristic feature. The milling drum is unequivocally described by the identifying element. It can be detected by way of respectively suitable means. For example, a barcode can be read out by means of a corresponding barcode reader provided on the milling machine. A letter sequence or number sequence used as an identifying element can represent a serial number of the milling drum. This can be read off by an operator of the milling machine and inputted via the input device. It is also possible for the letter sequence or number sequence to be detected with the aid of a suitable sensor or the camera. All the variants described enable rapid and unequivocal recognition of the type of milling drum installed in the milling machine, so that a value to be set, or a setting range, for the at least one machine parameter can be specified.

Provision can furthermore be made that in addition to the milling drum type, the orientation of the milling drum is also recognized. This is advantageous in particular when milling machines can be used for both co-directional and counter-directional milling. Identical milling drums can be used in this context for both methods. The orientation of the milling drum can be recognized, for example, by the fact that the means for recognizing external features of the milling drum also detect the orientation of the tools on the milling drum. Alternatively, different identifying elements can be mounted on the milling drum in such a way that depending on the orientation of the milling drum, only that respective identifying element which contains the current orientation of the milling drum is detected. For example, if an identifying element on one end face of the milling drum is detected, different identifying elements can be mounted on the two end faces.

According to a particularly preferred variant embodiment of the invention, provision can be made that a reading device for active or for passive transponders is indirectly or directly associated with the milling machine as a means for detecting the characteristic feature of the installed milling drum.

Provision can furthermore be made that an active or passive transponder is arranged in or on the milling drum; and that the identifying element is stored in the transponder.

An identifying element, constituting a characteristic feature of the milling drum which unequivocally establishes the type of milling drum, can be permanently stored in such a transponder. A transponder of this kind can be read out in quick and error-free fashion even in harsh environmental conditions.

According to an advantageous embodiment of the invention provision can be made that the identifying element and/or the active or passive transponder is arranged in or on a milling drum tube or in or on a tool holder or in or on a milling tool of the milling drum. The tool holder in this context can be in particular a bit holder, and the milling tool can be a bit. The identifying element or the passive transponder can thereby be arranged so that it is definitely arranged within the detection region of the means for determining the characteristic feature of the milling drum, or travels into the detection region during a revolution of the milling drum. The identifying element or the transponder can be provided on one of the components, or identifying elements or transponders can be arranged on several of the components, for example on the milling drum tube and on the milling tools. In the latter case the identifying elements or transponders can contain the same or complementary information.

Advantageously, in the context of a rotating milling drum the identifying element, for example a barcode, a transponder, or the like, can be used in order to determine the rotation speed of the milling drum. The length of the period during which the identifying element is detected can be determined for this purpose.

Suitable operation of the milling machine can be ensured in particular by the fact that the control unit is designed to specify, depending on the characteristic feature and/or on the type of milling drum determined from the characteristic feature, the value to be set, or the setting range, for a milling depth and/or a milling drum rotation speed and/or an advance speed of the milling machine and/or a drive power transferred to the milling drum and/or a torque transferred to the milling drum and/or a rotation speed of a motor driving the milling drum, as a machine parameter of the milling machine. The operation of the milling machine can be optimally adapted to the respective milling task, and to the milling drum being used, by setting these, or some of these, machine parameters. Provision can also be made that the control unit is designed to specify, depending on the characteristic feature and/or on the type of milling drum determined from the characteristic feature, a maximum milling depth and/or a minimum advance speed and/or a maximum advance speed. The setting range for the milling depth and the advance speed of the milling machine can thereby be unequivocally narrowed down and specified.

For optimum execution of a specific milling task it can be necessary to set specific machine parameters depending on the setting of further machine parameters. In order to take this in account, provision can be made that the control unit is designed to specify values to be set, and/or setting ranges, for at least two machine parameters depending on the characteristic feature and/or on the type of milling drum determined from the characteristic feature, in such a way that a ratio of the two machine parameters assumes a specified value or that the ratio lies within a specified range. In the context of fine milling, for example, it is necessary for the advance speed of the milling machine and the milling drum rotation speed to exhibit a specific ratio with respect to one another in order to avoid undesired structures on the road surface.

The machine parameter or parameters which are required depending on the type of milling drum that has been detected can be set by the fact that the control unit is designed to operate the milling machine with that value of the at least one machine parameter which is specified depending on the characteristic feature and/or on the type of milling drum determined from the characteristic feature; and/or that the control unit is connected to an output device; and that the control unit is designed to indicate to an operator of the milling machine, via the output device, that value to be set, or that value range, of the at least one machine parameter which is specified depending on the characteristic feature and/or on the type of milling drum determined from the characteristic feature. Incorrect settings can be reliably avoided thanks to the automatic setting of the machine parameter by the control unit. Indicating a suitable value or setting range of at least one machine parameter to an operator of the milling machine makes it easier for the operator to set the machine parameters correctly. The indication can occur via a display or via optical or acoustic indicating means that signal, for example, when a value falls above or below the specific setting range or when the selected setting is within the setting range or corresponds to the value to be set. The control unit can furthermore be configured to limit the at least one machine parameter that is settable by the machine operator to an advantageous setting range depending on the characteristic feature and/or on the type of milling drum determined from the characteristic feature. The machine operator thus can no longer set the at least one machine parameter within the entire value range achievable in principle with the machine, but instead is restricted to a range in which optimized operation is possible depending on the characteristic feature and/or on the type of milling drum determined from the characteristic feature.

According to a possible variant embodiment of the invention provision can be made that at least one input means is associated with the control unit; that at least one material property of the substrate to be milled, and/or at least one additive delivered to the milling process, is detectable by way of the input means and deliverable to the control unit; and that the control unit is designed to take the at least one material property and/or the at least one additive into account in specifying the value to be set, or the setting range, for the at least one machine parameter. Alongside the nature of the milling task to be carried out and the milling drum used for it, the material properties of the substrate to be processed substantially determine the selection of suitable machine parameters. Taking these material properties into account thus allows the value which is to be set for the at least one machine parameter to be better adapted to the milling task, or the setting range can be more narrowly specified. For example, an abrasiveness and/or a hardness and/or a material type and/or a material composition and/or a layer structure can be taken into account as material properties when specifying the machine parameter or parameters. The types of material to be removed can furthermore be indicated by statements such as "asphalt" or "concrete," with their known material properties, and correspondingly taken into account. A requisite addition of additives, for example of binders such as water, lime, cement, or corresponding suspensions, can also have an influence on the optimum values or setting ranges of one or more machine parameters, and can therefore be correspondingly taken into account. The input means that is provided can be, for example, the input device that is also used to input the type of milling drum, for example in the form of a keypad. Alternatively thereto, the material properties can also be detected via suitable sensors that are arranged on the milling machine. The additives being used can also already be stored in the control system and can be taken into account in the context of optimization of the machine parameters.

Optimum operation of the milling machine can be achieved by the fact that the value to be set, and/or the specified setting range, of the at least one machine parameter is overridable by an operator and/or that the control unit is designed to output a warning notification upon occurrence of an override of the value to be set and/or of the specified setting range. The milling machine can thus be operated with settings of the machine parameter or parameters which deviate from the value to be set or the setting range. Values based on the operator's experience, or peculiarities of the milling task at hand, can thus also be taken into account in the context of selection of the machine parameters.

Provision can additionally be made that the control unit is designed to identify individual milling drums depending on the characteristic feature, and to detect the operating duration of the milling drum and/or replacement intervals for milling tools of the milling drum. The data thereby acquired can be used to optimize the load on the milling drum and to optimize replacement intervals for the milling tools, in particular bits, and thus to prevent damage to the milling drum. For this, provision can be made that additional information for operation of the milling drum (for example, points in time for bit changes, number of bits replaced, or the like) is detected by the control unit. This additional information can be inputted, for example, by the operator via existing input means of the control unit.

That object of the invention which relates to the milling drum is achieved in that an active or passive transponder is arranged in or on the milling drum; and that a readout-capable identifying element of the milling drum is stored in the transponder. The milling drum is thus unequivocally identified over its entire service life. The transponder, arranged in protected fashion, is maintenance-free. In addition to the identification of the milling drum, further data relating to the milling drum can be stored in the transponder, for example an operating duration or a degree of wear on the attached milling tools.

BRIEF DESCRIPTION OF THE DRAWINGS

The invention will be explained in further detail below with reference to an exemplifying embodiment depicted in the drawings, in which.

DETAILED DESCRIPTION

Figure 1:
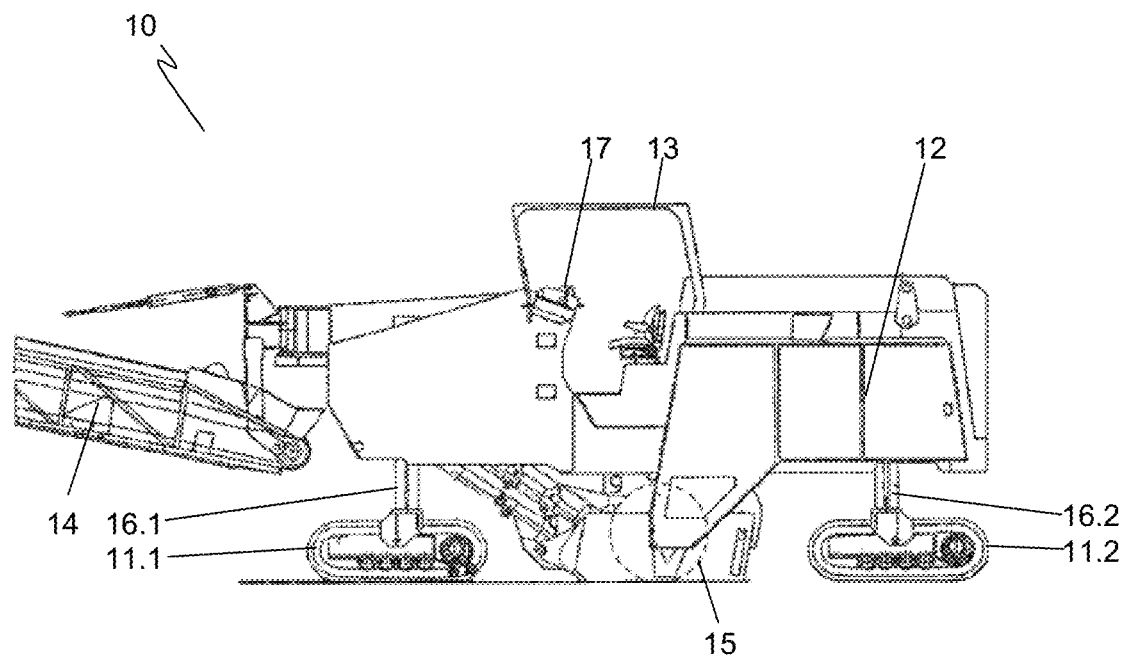
FIG. 1 is a schematic side view depicting a first milling machine in the form of a road milling machine.

FIG. 1 is a schematic side view depicting a first milling machine 10 in the form of a road milling machine. A machine frame 12 is carried by drive units 11.1, 11.2, for example track drive units, vertically adjustably via four lifting columns 16.1, 16.2. First milling machine 10 can be operated from a control station 13 via a control system 17 arranged in control station 13. A milling drum 15, depicted with dashed lines in the Figure and arranged in concealed fashion, is rotatably mounted in a milling drum housing that is likewise arranged in concealed fashion. A conveyor device 14 serves to transport the milled material away.

Figure 2:
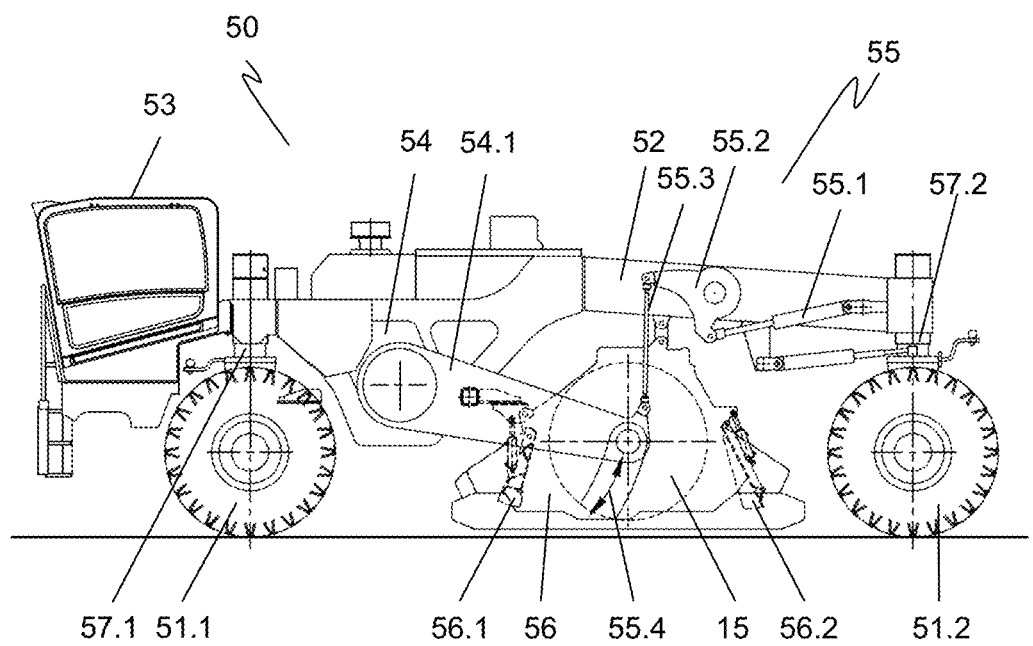
FIG. 2 is a schematic side view depicting a second milling machine in the form of a stabilizer.
Figure 3:
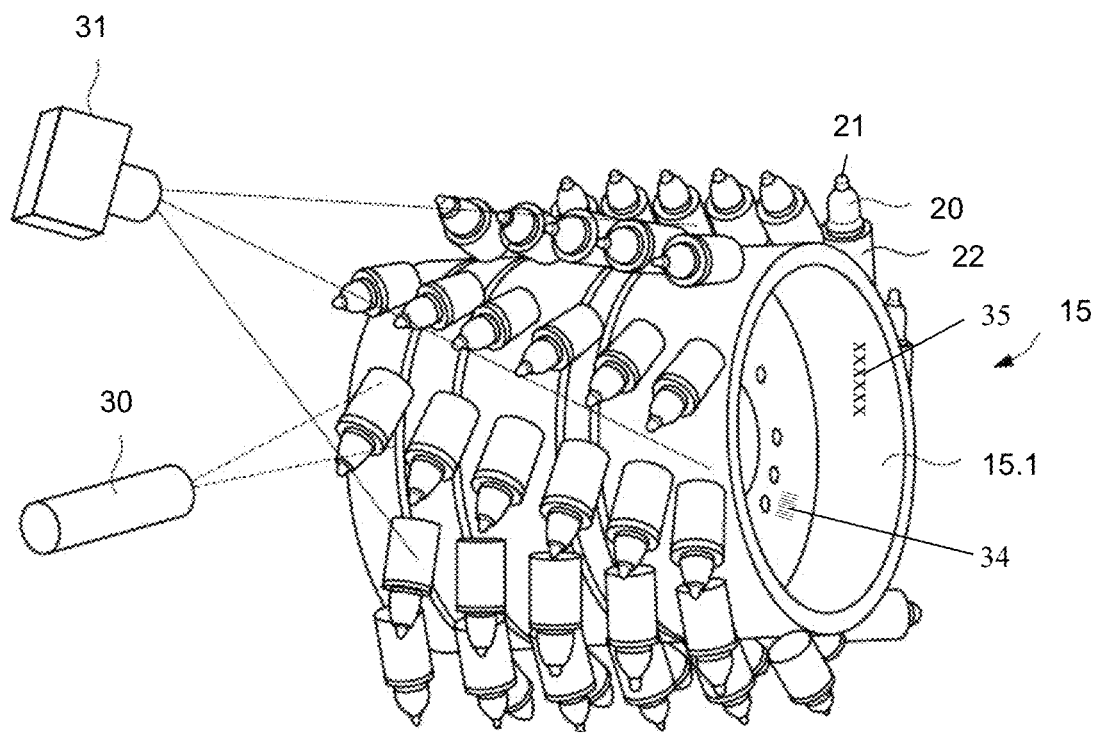
FIG. 3 shows a first type of milling drum having a camera.
Figure 4:
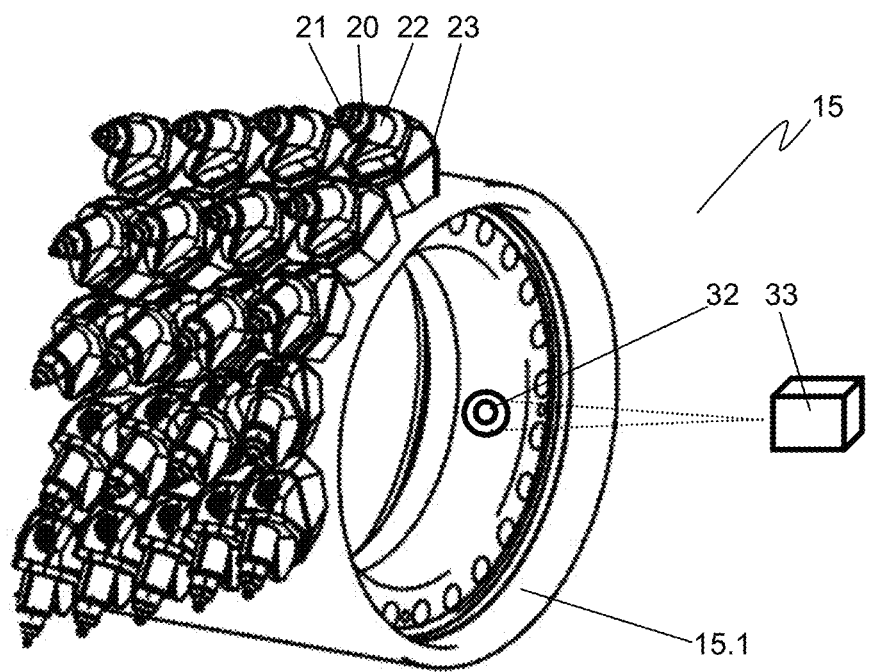
FIG. 4 shows a second type of milling drum having a transponder.

In use, machine frame 12 is moved, at an advance speed inputted via control system 17, over the substrate to be worked, in which context bits 20, arranged in the rotating milling drum 15 and shown in FIGS. 3 and 4, remove the substrate. The vertical position and the rotation speed of milling drum 15 can be set from control system 17. The milling depth is set by way of the vertical position of milling drum 15. The vertical position of the milling drum can be established, depending on the type of machine, via the vertically adjustable lifting columns 16.1, 16.2. Alternatively, for example as in the case of second milling machine 50 shown in FIG. 2, milling drum 15 can be vertically adjustable relative to machine frame 12.

FIG. 2 is a schematic side view depicting a second milling machine 50 in the form of a stabilizer. Second milling machine 50 is moved by means of front and rear wheels 51.1, 51.2. Front and rear wheels 51.1 and 51.2 are attached to chassis 52 via front and rear lifting columns 57.1, 57.2, so that the working height of chassis 52 and thus of drum housing 56 can be adjusted. A machine control station 53 is mounted on chassis 52. Motor 54, arranged inside chassis 52, drives milling drum 15 via a drive unit 54.1. Milling drum 15 itself is supported in a drum housing 56 that has a front and a rear drum flap 56.1, 56.2 associated it. Drum flaps 56.1, 56.2 are each embodied adjustably via an attached hydraulic system. Milling drum 15 is settable in terms of height, over an adjustment travel 55.4 indicated by a double arrow, by way of a hydraulic vertical adjustment system 55. For this, the motion of a hydraulic cylinder 55.1 is transferred to milling drum 15 via a rotatably mounted deflection lever 55.2 and a positioning rod 55.3 arranged thereon. The milling depth can be set with the aid of the vertical adjustment system.

FIG. 3 shows more clearly a first type of milling drum 15 having a camera 31 and a light source 30. In an axial direction, only one end segment of milling drum 15 is depicted. A plurality of bit holders 22 (tool holders) are attached to the surface of a milling drum tube 15.1 of milling drum 15. A bit 20, constituting a milling tool, is held in each bit holder 22. Bit 20 has a bit tip 21 made of a hard material, in particular of carbide metal. In the present example, bit holders 22 are welded directly onto milling drum 15. It is also conceivable, however, to use quick-change tool holder systems as described in more detail with reference to FIG. 4. A serial number 35 and a barcode 34 are mounted in the inner region of milling drum tube 15.1 depicted in FIG. 3. Barcode 34 represents serial number 35 in encoded form.

Bits 20 are arranged on milling drum tube 15.1 with comparatively large spacings. A milling drum 15 of this kind is provided as a standard milling drum, for example for removing entire road layers.

FIG. 4 shows a second type of milling drum 15 having a transponder 32. Here as well, in an axial direction only one end segment of milling drum 15 is depicted. Transponder 32 is arranged in protected fashion in the inner region of milling drum tube 15.1. A reading device 33 for reading out transponder 32 is schematically depicted. Reading device 33 is advantageously arranged on milling machine 10, 50 in such a way that it is in radio contact with transponder 32 at least at times during a revolution of milling drum 15. An unequivocal identifying element, for example a serial number, which unequivocally defines the type of milling drum 15, is stored in transponder 32. If radio contact exists between the reading device and the transponder only in certain positions of the milling drum, the apparatus can additionally be used to accurately determine the milling drum rotation speed.

A base part 23 is welded onto milling drum tube 15.1 in order to fasten bits on milling drum tube 15.1. Bit holder 22 is releasably attached to base part 23 for reception of a replaceable bit 20.

For better clarity in the view as shown, the surface of milling drum tube is occupied only in portions by base parts 23, bit holders 22, and associated bits In actuality the entire surface of milling drum tube 15.1 is populated with base parts 23, bit holders 22, and bits 20.

In the present exemplifying embodiment, bits 20 are closely spaced as compared with milling drum 15 shown in FIG. 3. Milling drum 15 is a fine milling drum for targeted structuring and for restoring the evenness of a road surface.

Figure 5:
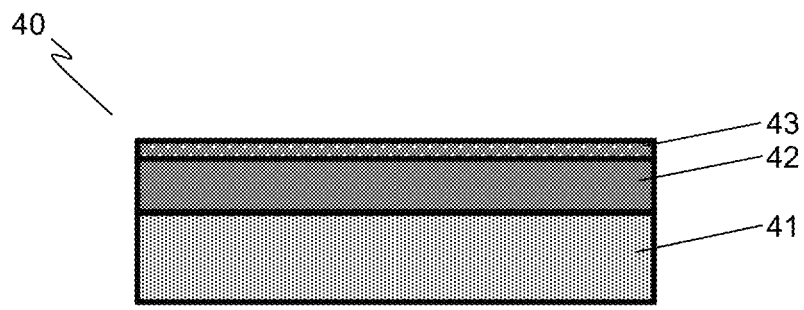
FIG. 5 is a simplified schematic depiction of a typical structure of a road.

FIG. 5 is a simplified schematic depiction of an exemplifying structure of a road 40. It is made up of a substructure 41 as well as an asphalt layer made up of a base layer 42 and a final surface layer 43.

Figure 6:
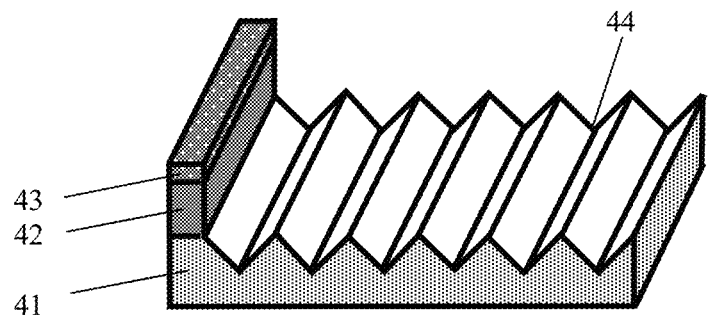
FIG. 6 schematically shows a milling pattern that can be generated by a standard mill upon removal of a surface layer and a base layer of a road.

FIG. 6 schematically shows a milling pattern that can be generated upon removal of surface layer 43 and base layer 42 of a road 40 using a standard mill. Coarse milling grooves 44, caused by the milling process, are clearly evident in substructure 41.

Figure 7:
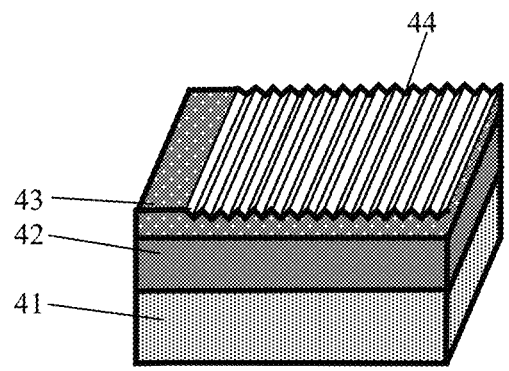
FIG. 7 schematically shows a milling pattern of a surface layer, partly removed with a fine milling drum, of a road.

FIG. 7 schematically shows a milling pattern of a surface layer 43, partly removed with a fine milling drum, of road 40. In the region of the milled track, surface layer 43 exhibits a structure in the form of fine milling grooves 44.

First milling machine 10 shown in FIG. 1 can be used for a variety of assignments. For example, the road milling machine that is depicted can be used for fine milling of road surfaces, in which only the upper surface, or parts of the upper surface, of surface layer 43 of road is removed, as shown in FIG. 7. The surface structure of road 40 can thereby be modified, or evenness restored. For fine milling, first milling machine 10 is fitted with a fine mill as shown by way of example in FIG. 4.

In a further application, first milling machine 10 can be used to remove surface layer 43 and/or base layer 42 of road 40. The material of surface layer 43 and of base layer 42 which is removed can be milled off separately or together, recycled in a separate recycling facility, and then reused for road building. A standard milling drum, as shown by way of example in FIG. 3, is installed in first milling machine 10 for removal of the road layers.

Alternatively, milling machines 10, 50 can be designed to reprocess the resulting milled material on-site in the context of a cold recycling process, and to apply it as a renewed pavement onto substrate 41. Corresponding binding agents, for example bituminous binding agents, are delivered in this context to the milled material and mixed with the milled material during the milling process. With first milling machine 10, the milled material processed in this fashion can be transferred with conveyor device 14, for example, to a road paver and used to construct a new pavement. With both milling machines 10, 50, alternatively, the milled material can remain in the milled track directly behind milling drum 15, and optionally can be pre-compacted using corresponding apparatuses on the respective milling machine 10, Final compaction of the renewed pavement is effected using subsequent roller trains.

In a further application, a stabilizer in accordance with second milling machine 50 can be used for stabilization, for example, of substrate 41 of road 40 depicted in highly simplified fashion in FIG. 5, before application of base and surface layers 42, 43. For this, the substrate is milled into by milling drum 15 and is mixed with binding agents, for example water, lime, cement, or corresponding suspensions. Comminution and homogenization of the milled ground material that is present may also occur in this context. The mixture thus obtained usually remains in the milled track and is then optionally compacted with roller trains, for example in order to form a load-bearing substrate 41 for base layer 42 and surface layer 43 of road 40.

Milling machines 10, 50 are equipped with different milling drums 15 for the various milling tasks that can be carried out. Milling drums 15 that correspond or are similar to the standard milling drum shown in FIG. 3 are used in order to remove entire road layers, for example to take off base layer 42 and surface layer 43 together. Fine milling drums that correspond or are similar to FIG. 4, which as compared with the standard milling drum depicted in FIG. 3 comprise an appreciably larger number of milling tools, are used for fine milling. With milling drums 15 for stabilizing substrate 41, on the other hand, the milling tools are arranged on struts that ensure good blending of the milled material. Different milling drums 15, each optimized for specific application sectors, can also be incorporated into milling machine 10, 50 for identical or similar assignments. Milling machine 10, 50 can furthermore be equipped with milling drums 15 of different working widths so that milling machine 10, 50 can be adapted to different assignments.

Milling machine 10, 50 must be operated with different machine parameters depending on the milling task to be carried out. In particular, the advance speed, milling drum rotation speed, and milling depth must be adapted to the particular assignment. Further machine parameters to be adapted are the rotation speed of a motor that drives milling drum 15, the power transferred to milling drum 15, or the torque transferred to milling drum 15.

Figure 9:
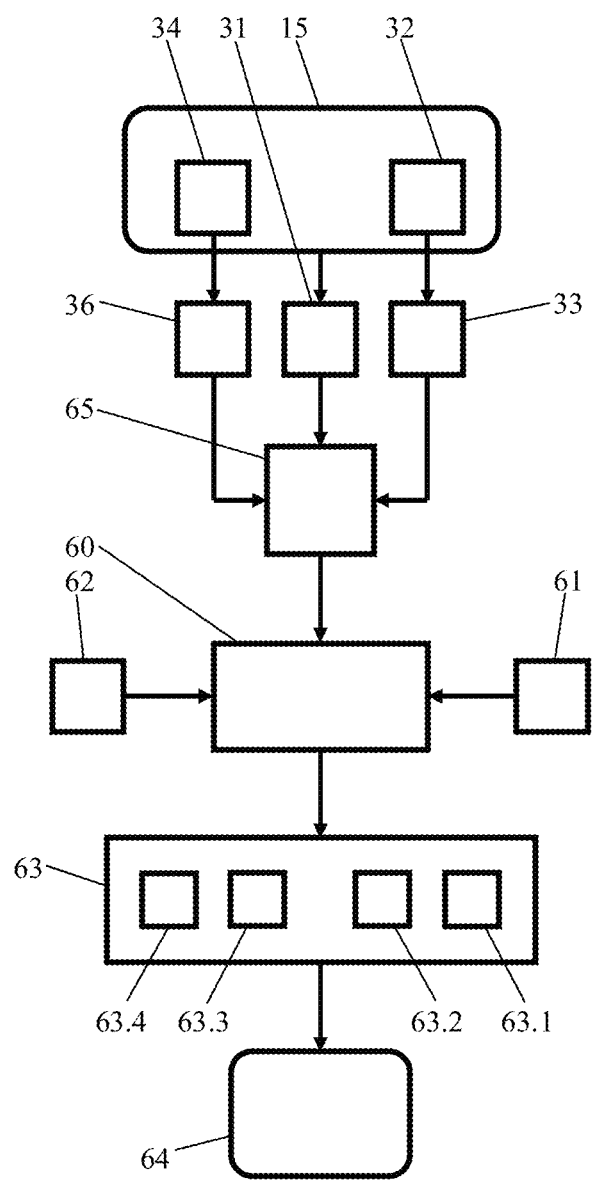
FIG. 9 is a schematic depiction for the determination of machine parameters of a milling machine.

Provision is made in accordance with the present invention that milling machine 10, 50 possesses means for detecting characteristic features of milling drum used in milling machine 10, 50. The type of milling drum 15 that is present can then be unequivocally determined, for example, with the aid of these characteristic features. Suitable machine parameters for the operation of milling machine 10, 50 are specified depending on the type of milling drum 15 thereby ascertained, or directly from the characteristic features. For example, when a large number of bits are located close to one another as one possible external characteristic feature of milling drum 15, it can be concluded that the present milling drum 15 is used for fine milling work, whereas a coarser milling task can be assumed when there are comparatively few bits 20. The milling task for which milling machine 10, 50 is intended to be used is also sufficiently known when the type of milling drum 15 is known. The machine parameters can thereby be adapted to the respective milling task and to milling drum 15 that is present. For this, one or more machine parameters can be set, or can be displayed to an operator of milling machine 10, 50, by a control unit 60 as shown in FIG. 9. The operator can likewise specify, for one or more machine parameters, setting ranges within which optimum operation of milling machine 10, 50 for the milling task at hand is possible. The operator can then set the machine parameter or parameters within the specified setting ranges. Provision is preferably made in this context that the specified setting ranges represent merely a recommendation, so that settings outside the specified setting ranges can also be made at the operator's discretion. Provision can be made for this purpose that data which mutually associate preferred machine parameters, preferred setting ranges for machine parameters, or preferred ratios among machine parameters, with specific characteristic features of the milling drum or with specific types of milling drums, are stored in control unit 60.

Properties of milling machine 10, 50 itself are preferably also taken into account in the specification of the machine parameter or parameters. For example, limitations on the machine parameters to be specified which result from the particular milling machine 10, 50 that is present, for example a maximum possible milling depth, a maximum advance speed, or a maximum drive power, can also be taken into account in the specification of the machine parameters. Different values to be set, or setting ranges, for the machine parameter or parameters can thus be specified for identical milling drums 15 for different milling machines 10, 50. Different milling machines 10, 50 can thereby be optimally adapted to the milling task and to milling drum 15 that is present.

If it is recognized in a possible application instance that a milling drum for fine milling is installed in milling machine 10, a limited setting range for the milling depth can then be specified as a machine parameter by specifying a maximum milling depth. It is thereby possible to avoid using fine milling drums for deeper milling work, since this does not allow satisfactory working output, results in increased wear on milling drum 15, and entails a risk of damage to milling drum 15 and to milling machine 10, 50. When a fine milling drum has been recognized, it is furthermore possible to specify a comparatively high value to be set, or setting range, as a machine parameter, so as thereby to generate a uniform surface structure. The maximum specified rotation speed of milling drum 15 can be defined here as that upper limit of the rotation speed range which appears suitable for fine milling using milling drum 15 that is present. It can also be limited, however, by the maximum rotation speed of milling drum 15 which can be set with the present milling machine 10, 50. In addition to the rotation speed of milling drum 15, a value to be set, or setting range, for the advance speed of milling machine 10, 50 can be specified as a further machine parameter, in such a way that the ratio between the advance speed and the milling drum rotation speed does not exceed a specific threshold value. It is thereby possible to avoid the occurrence of undesired structures on the surface being processed.

When a milling drum 15 for removing entire layers of the road structure is recognized, a high level of power transferred to milling drum 15 can be specified as a machine parameter. This too can be an individual value to be set or a preferred setting range. A value to be set, or a setting range, having a comparatively low milling drum rotation speed can furthermore be specified for a milling drum 15 (and thus an assignment) of this kind. The wear on bits 20 and on bit holders 22 can thereby, for example, be minimized.

According to a possible variant embodiment of the invention, provision can be made that in addition to the type of milling drum 15 used, at least one material property of the substrate to be milled, and/or an additive delivered into the milling process, is taken into account in specifying the value to be set, or the setting range, of the at least one machine parameter. The at least one material property of the substrate to be milled can be inputted, for example, by an operator of milling machine 10, 50. Alternatively thereto, milling machine 10 can comprise suitable sensors with which the relevant material properties can be detected. The additives can be materials for processing the removed road surface or for stabilizing the substrate. These can be specified, for example, by the operator of milling machine 50.

The type of milling drum that is installed can be detected in a variety of ways. One possibility involves visual detection by means of a camera 31 based on external characteristic features of milling drum 15, as symbolically shown in FIG. 3. Advantageously, a light source 30 is associated with camera 31 so that sufficient brightness for imaging of milling drum 15 by camera 31 exists even in milling drum housing 56. The type of milling drum 15 being used can be detected based on the camera images, for example by means of suitable evaluation software that advantageously is stored in a control unit 60 connected to camera 31. The evaluation software can evaluate characteristic features of milling drum 15, for example the number and/or arrangement of bits 20 or the external dimensions of milling drum 15. Alternatively or in addition thereto, a scanner can also be arranged for this purpose in the region of milling drum 15, which scanner, for example, detects the number, arrangement, and/or contour of bits 20 and recognizes therefrom, in interaction with suitable evaluation software, the type of milling drum 15.

Active or passive transponders 32, for example RFID transponders, can preferably be mounted on milling drums 15, as shown in FIG. 4. A suitable identifying element of milling drum 15 is stored in each of transponders 32. The identifying element represents a characteristic feature of milling drum 15 on the basis of which the type of milling drum 15 can be unequivocally determined. Suitable reading devices 33, with which transponders 32 can be read out, are then arranged on milling machines 10, 50. The data thereby obtained are forwarded to a control unit 60 that, on the basis of the data, detects the type of milling drum 15 and specifies the associated machine parameters as a value to be set or a setting range.

According to a further variant embodiment provision can be made that barcodes 34 are mounted on milling drums 15, as shown in FIG. 3. Barcodes 34 represent a characteristic feature for unequivocal identification of the respective milling drum 15. At least one suitable barcode reader is then mounted on milling machine 10, 50 and connected to control unit 60. The latter determines the type of milling drum 15 depending on the identifying element ascertained via the barcode reader, and thereupon specifies the value to be set, or the setting range, of the relevant machine parameter or parameters. Further forms of identifying element, for example number sequences or letter sequences, which unequivocally indicate the type of milling drum 15, can also be mounted on milling drums 15. An identifier of this kind can be read off by an operator of milling machine 10, 50 and delivered to control unit 60 via an input unit, for example in the form of a keypad. Alternatively thereto, the identifier can also be detected via camera 31 shown in FIG. 3 or another sensor system, and forwarded to control unit 60. The identifier can be, for example, a serial number 35 of milling drum 15, as shown in FIG. 3.

Advantageously, the identifying element of milling drum 15 can be such that it can be read out in the context of rotation of milling drum 15. For example, a barcode 34 can be moved past a barcode scanner by the rotation of milling drum 15 and thereby read out. It is likewise conceivable for the milling machine to have associated with it a proximity switch whose detection region is directed, for example, toward the end face of milling drum tube 15.1 or toward a further region of milling drum tube 15.1 that is moved past the proximity switch by the rotation of milling drum 15. Elevations and depressions can then be mounted on milling drum tube 15.1 so that the proximity switch switches or does not switch depending on the position of milling drum 15. The identifying element on the milling drum can thereby be coded, and can be read out via the switching pulses of the proximity switch. Detection can then be accomplished, for example, at a known rotation speed of the milling drum, or the identifying element possesses "start/stop" identifiers, the "start" identifier marking the beginning, and the "stop" identifier marking the end, of the identifying element, for example a serial number of milling drum 15. The rotation speed of the drum can moreover also be ascertained, for example, by detecting repeated "start" and/or "stop" signals and ascertaining the time between those signals.

In a further embodiment of the invention provision is made that specifications for setting specific machine parameters are stored on or in milling drum 15, and are read out via suitable readout means and delivered to control unit Values to be set, or setting ranges, of the respective machine parameters can be stored, for example, in active or passive transponders 32 or in the form of barcodes 34.

Figure 8:
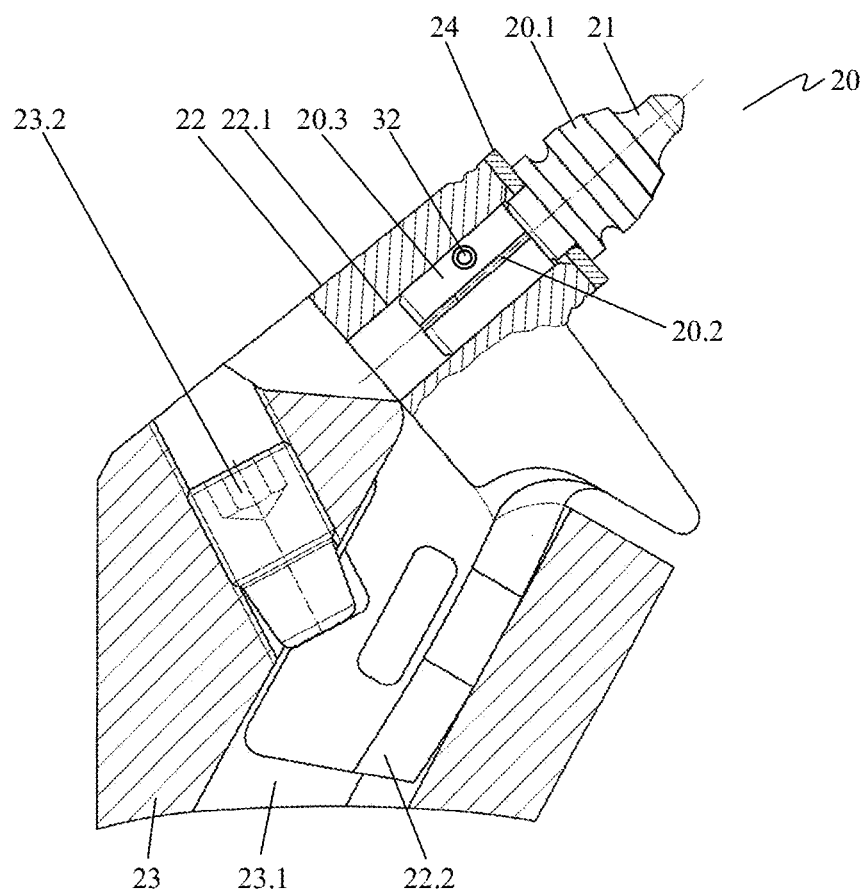
FIG. 8 is a lateral section view of a bit holder mounted on a base part and having a bit.

FIG. 8 is a lateral section view of a bit holder 22, mounted on a base part 23, having a bit 20 constituting a milling tool.

Bit tip 21 is attached, preferably by intermaterial connection, to a bit head 20.1 of bit 20. Oppositely to bit tip 21, bit head 20.1 transitions into a bit shank The cylindrically embodied bit shank 20.2 is held via a clamping sleeve 20.3, rotatably around its longitudinal axis and in axially blocked fashion, in a bit receptacle 22.1 of bit holder 22. A wear disk 24 is arranged between bit head 20.1 and bit holder 22. Bit holder 22 comprises an insertion projection 22.2 that is introduced into a shank receptacle 23.1 of base part 23 and is clamped in place there by means of a clamping screw 23.2. Base part 23 itself is attached, preferably welded, to a milling drum tube 15.1 (not depicted).

A transponder 32 is arranged in the region of bit shank 20.2. Transponder 32 can be embodied as an active or passive transponder 32. Stored in it is an identifying element that indicates the type of bit 20 constituting an inserted milling tool. Different bits 20 are provided for different milling tasks. When the type of bit 20 is known, the milling task to be carried out can thus be inferred and the machine parameter or parameters for operating milling machine 10, 50 can be correspondingly specified.

In addition or alternatively to bit 20, bit holder 22 and/or base part 23 can also be identified. An additional identifying element of milling drum tube 15.1 can also be provided. The at least one machine parameter can be specified depending on a combined evaluation of the identifying elements. For example, the nature of the milling task (e.g. fine milling) can be determined based on the identification of the milling tool, in the present case of bit 20. The identifying element of milling drum tube 15.1 can indicate, among other things, the axial length of milling drum tube 15.1. Based on the type of milling tool determined, different values or value ranges for the at least one machine parameter can now be specified for the milling task (fine milling) for milling drum tubes 15.1 of different lengths.

FIG. 9 is a schematic depiction for the determination of machine parameters of milling machine 10, 50. The characteristic features of milling drum 15 that are provided are its outer contour as well as identifying elements in the form of a barcode 34 and a transponder 32. The outer contour is detected with the aid of a camera 31. Transponder 32 is read out with the aid of a reading device 33, and barcode 34 is detected and decoded by means of a barcode reader 36. These three options for detecting characteristic features of milling drum 15 are provided in the present case, although it is additionally or alternatively conceivable to detect further features, or only some of the features stated.

Reading device 33, camera 31, and barcode reader 36 are connected to a block 65 for creating the characteristic feature. The characteristic feature is forwarded to control unit 60. Control unit 60 is furthermore connected to a database 62 and to an input unit 61. Control unit 60 creates, from the characteristic feature or features, a machine parameter set 63 for milling machine 10, 50. In the present case machine parameter set 63 encompasses a maximum milling depth 63.1, a minimum milling depth 63.2, a maximum advance 63.3, and a minimum advance 63.4 within which milling machine 10, 50 is to be operated with the milling drum that was detected. Machine parameter set 63 is outputted to a machine driver by means of an output device, in the present case in the form of a display 64.

The above-described control unit 60 is thus embodied as a computer system. The latter encompasses (not depicted) at least one processor, a computer-readable storage medium, database 62, input unit 61, and output unit 64. Input unit 61 can be embodied as a keypad or as another user interface, and enables an operator to input instructions. Output unit 64 can be embodied as a display or in the form of another optical or acoustic indication. The processor can be embodied as a single controller that encompasses the entire functionality described; or multiple controllers, among which the above-described functionality is distributed, can be provided.

A "computer-readable memory medium" is to be understood for present purposes as any form of a nonvolatile memory medium that contains a computer program product in the form of a software program executable by the processor, computer instructions, or program modules. These, when executed, can make data available or can in another fashion cause the computer system to implement an instruction or to work in a specific manner as defined above. Provision can furthermore be made that more than one type of memory media can be combined so that software executable by the processor, computer instructions, or program modules are directed from a first memory medium in which the software, the computer instructions, or the program modules are initially stored, to the microprocessor for execution.

The memory media as used here can be, in non-limiting fashion, transfer media or data media. The data media can be, equivalently, volatile and nonvolatile, removable and non-removable media. These can be embodied in the form of a dynamic memory, application-specific integrated circuits (ASICs), memory chips, optical or magnetic memories (CD), flash memories, or any other medium that is suitable for storing data in a form suitable for processors. Unless otherwise indicated, they can be arranged on a single computer platform or can be arranged in a manner distributed among multiple such platforms.

"Transfer media" can encompass all concrete media that are suitable for allowing software executable by the processor, computer instructions, or program modules to be read out and executed via them by a processor. Cables, leads, fiber optics, or known wireless media can be used, without limitation, for this.

In a further embodiment provision can be made that the processor does not represent or require a computer system. It can be embodied separately or can be otherwise configured independently inside a machine, for example in a general purpose processor, a digital signal processor (DSP), an application-specific integrated circuit (ASIC), a field programmable gate array (FPGA), or in other programmable logic modules, in a logic gate (discrete gate), or in a logical transistor circuit, discrete hardware components, or any combination thereof that is designed or programmed to perform or bring about the above-described functions. The general purpose processor can be a microprocessor or, alternatively, a microcontroller, a state machine, or a combination thereof.

The processor can also be implemented as a combination of computing devices, for example as a combination of a DSP with a microprocessor, a plurality of microprocessors, one or more microprocessors in conjunction with a DSP core, or any other such combination.

Specific actions, sequences, or functions of each of the algorithms described with reference to the controller can execute in a different sequences depending on the configuration, and they can be added or connected or omitted (for example, if not all the above-described functions are necessary for execution of the algorithm). Actions, sequences, or functions can furthermore be executed simultaneously in certain embodiments, for example by multi-threaded processing, interrupted processing, or by means of multiple processors or processor cores or any other parallel architecture.

As depicted in FIG. 9, characteristic features of milling drum 15 are delivered to control unit 60. These can be an identifier that has been read out by means of barcode reader 36 or reading device 33 of transponder 32, or external features of milling drum 15 that have been imaged by camera 31. Control unit 60 is designed to recognize, based on the characteristic features delivered, the type of milling drum 15 installed. For that purpose it compares the characteristic features with data stored in database 62. Alternatively thereto, the type of milling drum 15 can also be inputted via input unit 61. Once the type of milling drum 15 is known, control unit 60 ascertains suitable machine parameters or ranges of suitable machine parameters within which milling machine 10, 50 can be optimally operated with the milling drum 15 that is present. In the exemplifying embodiment depicted, these are displayed to a machine driver by means of output device 64. In the present case the machine driver receives specifications as to suitable ranges for advance and milling depth. He or she can thus set the corresponding machine parameters. It is also conceivable for the machine parameters to be forwarded directly to a machine control system, and to be set by it automatically in order to operate milling machine 50.

Figure 10:
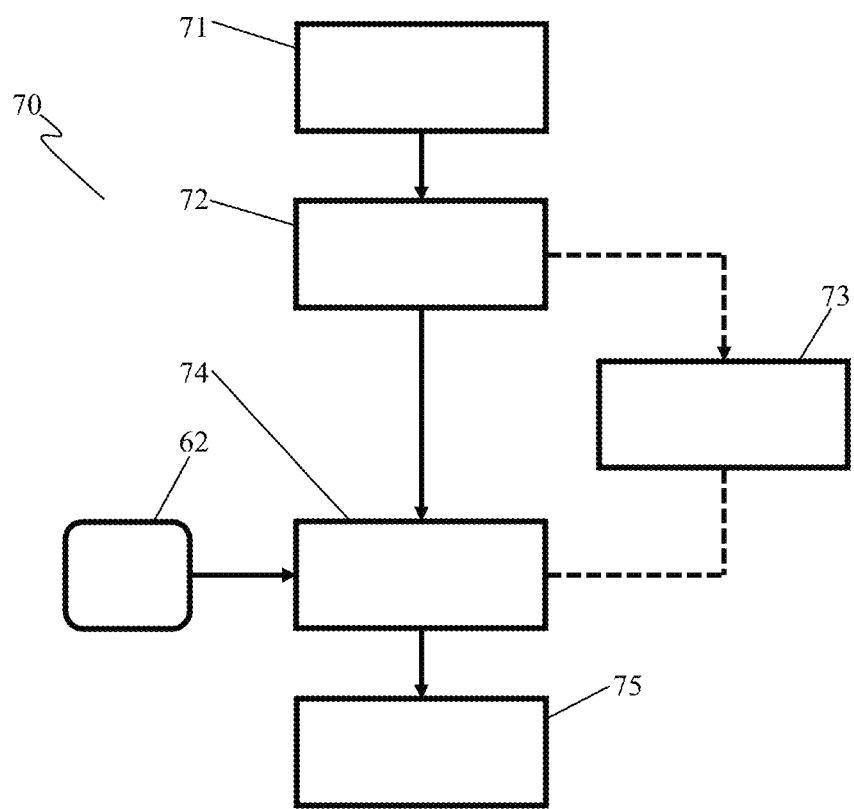
FIG. 10 is a flow chart for determining machine parameters of a milling machine.

FIG. 10 shows a flow chart 70 for determining machine parameters of a milling machine 10, 50. The flow chart comprises five blocks 71, 72, 73, 74, 75 as well as database 62. In first block 71 the sensor values are read out, for example, from camera 31, barcode reader 36, or reading device 33 for transponder 32 shown in FIG. 9. In second block 72, the characteristic feature of milling drum 15 is determined therefrom. In an optional step in a third block 73, the milling drum type can be ascertained from the previously detected characteristic feature. In the fourth block, the machine parameter or parameters suitable for operating milling machine 10, 50 are then determined directly from the characteristic feature or from the milling drum type. These can be concrete values or value ranges. Data from database 62 can be used to determine the machine parameters from the characteristic feature or from the milling drum type. In a fifth block 75 the machine parameters or machine parameter ranges are then outputted.

The invention claimed is:

1. A method for operating a milling machine comprising a milling drum having a transponder arranged therein or thereon, wherein the milling drum is one of a plurality of different milling drums replaceable in association with the milling machine, and wherein the transponder has stored therein an identifying element, the method comprising:
storing data relating to operation of the milling drum in the transponder;
detecting, using a reading device associated with the milling machine, the identifying element via the transponder and identifying the milling drum based on the detected identifying element;
transmitting the data relating to operation of the milling drum to a control unit associated with the milling machine.

2. The method of claim 1, comprising acquiring further data over time relating to continued operation of the milling drum, and storing the further data in the transponder.

3. The method of claim 1, wherein the data relating to operation of the milling drum comprises an operating duration for the milling drum.

4. The method of claim 1, wherein the data relating to operation of the milling drum comprises a degree of wear on one or more milling tools attached to the milling drum.

5. The method of claim 1, wherein the data relating to operation of the milling drum comprises replacement intervals for milling tools of the milling drum.

6. The method of claim 1, wherein the data relating to operation of the milling drum comprises one or more of: points in time for changes in one or more milling tools of the milling drum; a number of tools replaced during tool changes; and an operating duration for one or more of the milling tools.

7. The method of claim 1, wherein the milling drum comprises an active transponder that transmits the identifying element and/or the data relating to operation of the milling drum to the reading device.

8. The method of claim 1, wherein the milling drum comprises a passive transponder, and the reading device is configured to detect the identifying element and/or the data relating to operation of the milling drum.

9. The method of claim 1, wherein the transponder is arranged in or on one or more of: a milling drum tube; a tool holder; and a milling tool of the milling drum.

10. The method of claim 1, wherein the reading device is arranged on the milling machine to be in communication with the transponder at certain positions during a revolution of the milling drum, the method comprising determining a milling drum rotation speed based on detected communications between the reading device and the transponder.

11. The method of claim 1, comprising determining whether the milling drum is suitable for an upcoming milling task, based at least in part on the transmitted data relating to operation of the milling drum.

12. The method of claim 1, comprising determining whether the milling drum is suitable for an upcoming milling task, based at least in part on the detected identifying element.

13. A milling machine comprising:
- a milling drum having a transponder arranged therein or thereon, wherein the milling drum is one of a plurality of different milling drums replaceable in association with the milling machine, and wherein the transponder has stored therein an identifying element and data relating to operation of the milling drum;
- a reading device configured to detect the identifying element via the transponder and identifying the milling drum based on the detected identifying element; and
- a control unit separate from the milling drum and configured to receive the data relating to operation of the milling drum.

14. The milling machine of claim 13, wherein the control unit is configured to acquire further data over time relating to continued operation of the milling drum, and store the further data in the transponder.

15. The milling machine of claim 13, wherein the data relating to operation of the milling drum comprises one or more of:
- an operating duration for the milling drum;
- a degree of wear on one or more milling tools attached to the milling drum;
- replacement intervals for milling tools of the milling drum;
- points in time for changes in one or more milling tools of the milling drum;
- a number of tools replaced during tool changes; and
- an operating duration for one or more of the milling tools.

16. The milling machine of claim 13, wherein the milling drum comprises an active transponder that transmits the identifying element and/or the data relating to operation of the milling drum to the reading device.

17. The milling machine of claim 13, wherein the milling drum comprises a passive transponder, and the reading device is configured to detect the identifying element and/or the data relating to operation of the milling drum.

18. The milling machine of claim 13, wherein the transponder is arranged in or on one or more of: a milling drum tube; a tool holder; and a milling tool of the milling drum.

19. The milling machine of claim 13, wherein the reading device is arranged on the milling machine to be in communication with the transponder at certain positions during a revolution of the milling drum, and the control unit is configured to determine a milling drum rotation speed based on detected communications between the reading device and the transponder.

20. The milling machine of claim 13, wherein the control unit is configured to determine whether the milling drum is suitable for an upcoming milling task, based on the transmitted data relating to operation of the milling drum, and/or the detected identifying element.

* * * * *